United States Patent
Sato (10) Patent No.: US 8,299,760 B2
(45) Date of Patent: Oct. 30, 2012

(54) BATTERY CHARGER

(75) Inventor: Mitsugu Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 12/709,915

(22) Filed: Feb. 22, 2010

(65) Prior Publication Data

US 2010/0225281 A1 Sep. 9, 2010

(30) Foreign Application Priority Data

Mar. 5, 2009 (JP) ................. P2009-052717

(51) Int. Cl.
*H02J 7/04* (2006.01)
(52) U.S. Cl. ........ 320/150; 320/107; 320/112; 320/152; 320/162
(58) Field of Classification Search ............ 320/150
See application file for complete search history.

(56) References Cited

U.S. PATENT DOCUMENTS

| 7,456,605 B2 | 11/2008 | Nakasho et al. | |
| 2009/0108812 A1* | 4/2009 | Lee | 320/150 |
| 2009/0195215 A1* | 8/2009 | Sato et al. | 320/150 |

FOREIGN PATENT DOCUMENTS

| JP | 7-147730 | 6/1995 |
| JP | 10-094189 | 4/1998 |
| JP | 2006-074875 | 3/2006 |

* cited by examiner

*Primary Examiner* — Edward Tso
*Assistant Examiner* — Johail Torres Ruiz
(74) *Attorney, Agent, or Firm* — K&L Gates LLP (57) ABSTRACT

A battery charger includes: a circuit board including terminal portions provided to be exposed to the outside from an insertion portion, in which a secondary battery is inserted, and electrically connected to the secondary battery; a power circuit portion obtaining a voltage from an external power source and supplying a charging current to the secondary battery; a temperature detection unit detecting a battery temperature of the secondary battery; a charging control switch turning on/off the charging current; and a controller controlling the power circuit portion or the charging control switch based on a voltage and a current of the power circuit portion and the battery temperature, wherein the temperature detection unit is provided in a part of the circuit board opposed to the insertion portion at a distance from electronic components constituting the power circuit portion and the controller based on a heat generation temperature of the electronic components.

5 Claims, 8 Drawing Sheets

BATTERY CHARGER

CROSS REFERENCES TO RELATED APPLICATIONS

The present application claims priority to Japanese Priority Patent Application JP 2009-052717 filed in the Japan Patent Office on Mar. 5, 2009, the entire contents of which is hereby incorporated by reference.

BACKGROUND

The present application relates to a battery charger, and more particularly, to a battery charger for charging a lithium ion secondary battery.

In recent years, many portable electronic devices or apparatuses such as digital cameras, mobile phones, or laptop computers are appearing on the market, and there is a demand for them to be smaller in size and lighter in weight. In line with this, there is a rapidly increasing demand for batteries used as a power source of portable electronic devices or apparatuses. For realization of small devices or apparatuses, batteries are required to be designed to be lighter and thinner. In addition, effective use of internal accommodation space in a device or apparatus is also required. One of the widely used battery packs satisfying such requirements is a battery pack that uses lithium ion secondary batteries having high energy density and output density.

One of the widely used methods of charging lithium ion secondary batteries is a constant-current/constant-voltage method in which a charge mode is switched from a constant-current charge mode to a constant-voltage charge mode when a battery voltage reaches a predetermined voltage value. During the charging, the charging operation is controlled by measuring a temperature of a lithium ion secondary battery or a temperature of a battery pack itself.

In the related art, JP-A-7-147730 discloses a configuration in which a temperature detection device for measuring a temperature of a secondary battery is provided inside a battery pack accommodating the secondary battery. According to the configuration disclosed in JP-A-7-147730, a battery charger is able to detect the temperature of the secondary battery by using the temperature detection device inside the battery pack.

Moreover, JP-A-10-94189 discloses a technique in which a battery charger and a battery pack are provided with a temperature detection device, and charging of a secondary battery is controlled based on an output of either one of the temperature detection devices.

Furthermore, JP-A-2006-074875 discloses a battery charger having a configuration such that a temperature detection device comes into contact with a surface of a secondary battery when the secondary battery is fitted into the battery charger.

SUMMARY

However, such a configuration as disclosed in JP-A-7-147730 has a problem in that it may be impossible to detect the battery pack temperature on the battery charger side if the battery pack being used does not have a temperature detection device.

Moreover, such a configuration as disclosed in JP-A-10-94189 has a problem in that the costs will increase because both the battery pack and the battery charger have to be equipped with a temperature detection device.

Furthermore, such a configuration as disclosed in JP-A-10-94189 has a problem in that it may be difficult to measure the battery temperature with high accuracy because the temperature detection device is exposed to an outside of the battery charger and may be greatly influenced by the ambient temperature. In addition, the battery charger disclosed in JP-A-2006-074875 uses a discrete thermistor as the temperature detection device, which is expensive in product and mounting costs, leading to an increase in the cost of the battery charger itself. Moreover, when the temperature detection device is brought into contact with the secondary battery, the temperature detection device used may have a lead shape and be mounted in an unstable state, for example. A temperature detection device mounted in an unstable state may require an additional fixing component and an additional assembling step, thus leading to an increase in the manufacturing costs.

Another problem is that in any configuration, if the temperature detection device detects heat generated by components different from batteries, it may then be difficult to detect the battery temperature with high accuracy.

Thus, it is therefore desirable to clarify the requirements of the mounting positions of electronic components and enable a temperature of batteries being charged to be detected with high accuracy using a simple configuration.

According to an embodiment, there is provided a battery charger including: a circuit board including terminal portions that are provided to be exposed to the outside from an insertion portion, in which a secondary battery to be charged is inserted, and electrically connected to the secondary battery; a power circuit portion that obtains a voltage from an external power source and supplies a charging current to the secondary battery; a temperature detection unit that detects a battery temperature of the secondary battery; a charging control switch that turns on/off the charging current; and a controller that controls the power circuit portion or the charging control switch based on a voltage and a current of the power circuit portion and the battery temperature of the secondary battery, which are all mounted to a circuit board, wherein the temperature detection unit is provided in a part of the circuit board opposed to the insertion portion at a position spaced by a distance apart from each of a plurality of electronic components constituting the power circuit portion and the controller, the distance being equal to or larger than a predetermined distance which is set based on a heat generation temperature of each of the electronic components.

In the embodiment, the temperature detection unit is provided at the vicinity of the insertion portion in which the secondary battery is inserted. Therefore, it is possible to detect the battery temperature with high accuracy. Moreover, the heat-generating electronic components are mounted at positions spaced by a predetermined distance, which is determined based on their heat generation temperature, apart from the temperature detection unit. Therefore, the temperature detection unit will not detect heat generated by components different from the battery.

According to the embodiment, it is possible to detect a temperature of a battery pack with high accuracy on a battery charger side. Therefore, charge control based on the battery pack temperature can be performed effectively.

Additional features and advantages are described herein, and will be apparent from the following Detailed Description and the figures.

DETAILED DESCRIPTION

The present application will be described below with reference to the drawings according to an embodiment. The description will be given in the following order:

1. First Embodiment (Exemplary Layout of Temperature Detection Device and Other Electronic Components in Battery Charger Considering a Suitable Positional Relationship)

1. First Embodiment

Hereinafter, a first embodiment will be described with reference to the drawings.

(1-1) Configuration of Battery Charger

First, a battery charger according to the first embodiment will be described with reference to the drawings.

Figure 1:
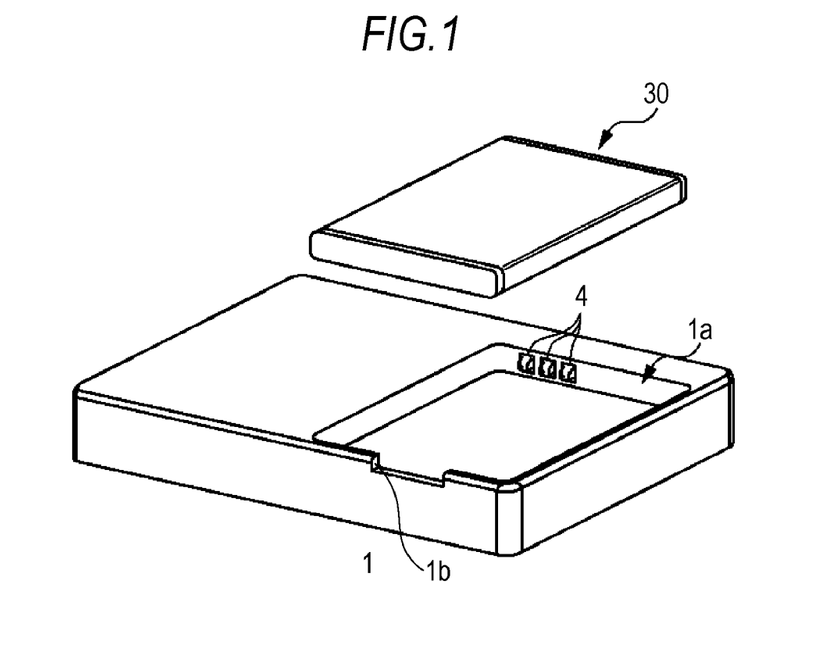
FIG. 1 is a perspective view schematically illustrating an outer appearance of a battery charger according to an embodiment and a battery pack which is inserted in and charged with a battery charger.
Figure 2:
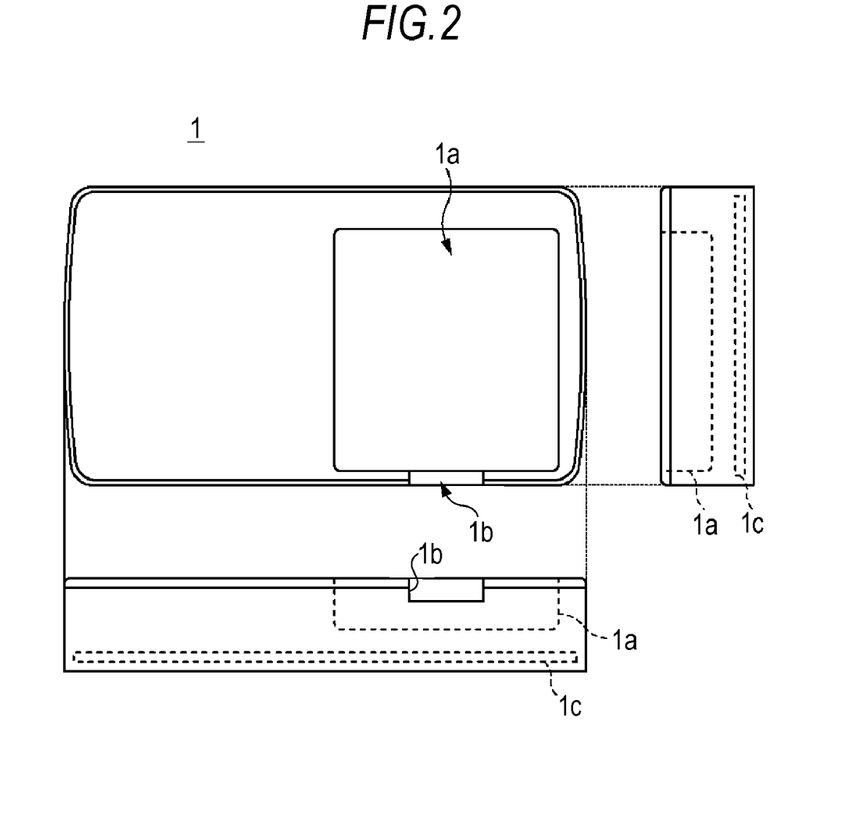
FIG. 2 is a top and side view of the battery charger according to the embodiment.

FIG. 1 is a perspective view schematically illustrating an outer appearance of a battery charger 1 according to the first embodiment of the present invention and a battery pack 30 which is inserted in and charged with the battery charger 1. FIG. 2 is a top and side views of the battery charger 1 according to the first embodiment.

The battery charger 1 is provided with a battery insertion portion 1a that is configured to engage with the battery pack 30. The battery charger 1 is further provided with terminals 4 which are exposed to the outside from a part of the battery charger 1 so that, when the battery pack 30 is inserted in the battery insertion portion 1a, the terminals 4 make contact with contact portions (not illustrated) which are exposed to the outside from an outer casing of the battery pack 30.

Furthermore, a notch portion 1b may be formed in the battery charger 1 so as to facilitate an operation of inserting and removing the battery pack 30 in or from the battery charger 1. For enhanced contact reliability between the terminals 4 and the contact portions of the battery pack 30, the terminals 4 are preferably configured to have a convex shape and spring-like properties.

The battery charger 1 is provided with a power supply terminal so as to obtain an AC voltage Vac from an external power source such as a household AC power source. The power supply terminal may be configured as a terminal such as a plug which is directly connected to the battery charger 1, or may be configured as a plug-in terminal in which a cable with a plug is inserted.

As illustrated in FIG. 2, a circuit board 1c, on which electronic components (not illustrated) necessary for charging the battery pack 30 are mounted, is provided inside the battery charger 1. Specifically, the electronic components mounted on the circuit board 1c include a temperature detection device for detecting a temperature of the battery pack 30 and a power circuit portion such as, for example, a switching IC, a power conversion transformer (hereinafter appropriately referred to a transformer), diodes, and FETs (field effect transistors).

Mounting Positions of Electronic Components

In an embodiment, for high accuracy detection of the temperature of the battery pack 30 being charged, the mounting positions of the temperature detection device and each electronic component are determined by the following two considerations.

(i) Positional Relationship between Temperature Detection Device and Battery Pack (ii) Distance between Temperature Detection Device and Electronic Component The two considerations will be described in detail below.

(i) Positional Relationship Between Temperature Detection Device and Battery Pack A temperature detection device is capable of detecting the temperature of the battery pack 30 with higher accuracy as it is located closer to the battery pack 30, and the temperature detection accuracy decreases as it becomes distant from the battery pack 30. That is to say, it is supposed that the distance between the temperature detection device and the battery pack 30 which is a subject of temperature measurement is approximately proportional to the detection accuracy. For this reason, the temperature detection device is provided at a position close to the battery insertion portion 1a of the battery charger 1.

In order to examine the above-mentioned relationship, a difference between the temperature of the battery pack 30 and the detection temperature obtained with the temperature detection device was measured while changing the position of the temperature detection device in such a battery charger 1 as illustrated in FIGS. 1 and 2.

Sample 1-1

Figure 3:
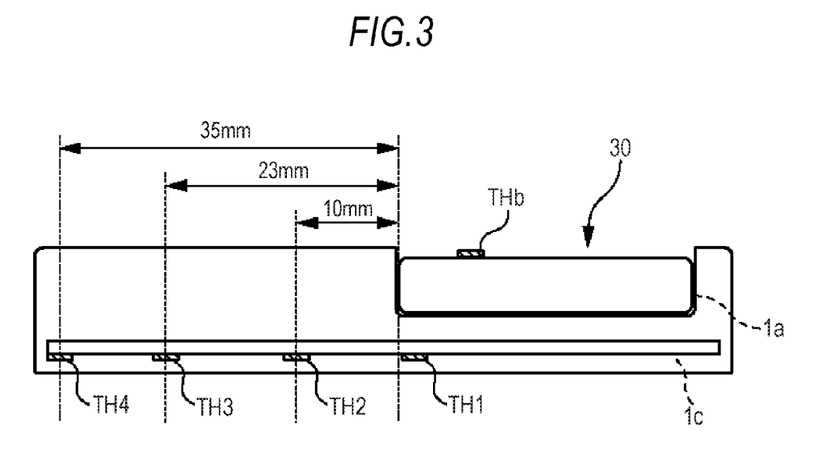
FIG. 3 is a sectional view illustrating the mounting positions of temperature detection devices in samples 1-1 to 1-4.

As illustrated in FIG. 3, when the battery pack 30 was charged, a temperature detection device THb is in contact with a surface of the battery pack 30 so as to measure the temperature of the battery pack 30. A battery charger having a temperature detection device TH1 as illustrated in FIG. 3 mounted on the circuit board 1c was used as Sample 1-1, and the detection temperatures obtained with the temperature detection devices THb and TH1 were measured. The temperature detection device TH1 was mounted within a region where the battery insertion portion 1a was provided. When a temperature detection device was mounted within this region, the distance between the battery pack 30 and the temperature detection device TH1 was defined as 0 mm.

Sample 1-2

A battery charger was prepared as Sample 1-2, similarly to the Sample 1-1 except that a temperature detection device TH2 was provided in lieu of the temperature detection device TH1, and the detection temperatures of the temperature detection devices THb and TH2 were measured. In the Sample 1-2, the temperature detection device TH2 was provided at a position spaced 10 mm apart from an end of the battery insertion portion 1a. In this case, the distance between the battery pack 30 and the temperature detection device TH2 was defined as 10 mm.

Sample 1-3

A battery charger was prepared as Sample 1-3, similarly to the Sample 1-1 except that a temperature detection device TH3 was provided in lieu of the temperature detection device TH1, and the detection temperatures of the temperature detection devices THb and TH3 were measured. In the Sample 1-3, the temperature detection device TH3 was provided at a position spaced 23 mm apart from an end of the battery insertion portion 1a.

Sample 1-4

A battery charger was prepared as Sample 1-4, similarly to the Sample 1-1 except that a temperature detection device TH4 was provided in lieu of the temperature detection device TH1, and the detection temperatures of the temperature detection devices THb and TH4 were measured. In the Sample 1-4, the temperature detection device TH4 was provided at a position spaced 35 mm apart from an end of the battery insertion portion 1a.

The battery charger 1 of each of the Samples 1-1 to 1-4 was connected to an external power source (AC voltage: 100 V) and the battery pack 30 was charged. For example, when a battery pack accommodating a lithium ion secondary battery is used, a charging method is typically used in which a charge mode is switched from a constant-current charge mode to a constant-voltage charge mode when a battery voltage reaches a predetermined value. In the constant-voltage charge mode, the charging current decreases as a charge state of the battery gets closer to a full charge state. For this reason, the temperature of the battery pack 30 reaches the highest point at a point in time when the constant-current charge mode ends, namely when the charge mode switches from the constant-current charge mode to the constant-voltage charge mode.

Therefore, in the measurements, the battery pack 30 was charged in a constant-current charge mode using a constant current of 250 mA until a voltage of the secondary battery in the battery pack 30 has reached 4.2 V per cell, and the temperature of the battery pack 30 was measured with the temperature detection devices THb and TH1 to TH4 whenever the charge mode was switched to a constant-voltage charge mode. Here, the battery temperature at the point in time when the charge mode switched from the constant-current charge mode to the constant-voltage charge mode will be referred to as a heat generation temperature.

The measurement results obtained with the temperature detection devices THb and TH1 to TH4 are shown in Table 1. In Table 1, the differences between the detection temperature obtained with the temperature detection device THb, which is the temperature of the battery pack 30, and the temperatures obtained with the temperature detection devices TH1 to TH4, which are detected on the circuit board 1c, are illustrated in relation with the corresponding distances of the temperature detection devices TH1 to TH4 relative to the temperature detection device THb.

TABLE 1

| | Distance between Battery Pack And Thermistor [mm] | Difference between Battery Pack Temperature and Thermistor Detection Temperature [° C.] |
|---|---|---|
| Sample 1-1 | 0 | 0.36 |
| Sample 1-2 | 10 | 0.49 |
| Sample 1-3 | 23 | 0.69 |
| Sample 1-4 | 35 | 0.71 |

Figure 4:
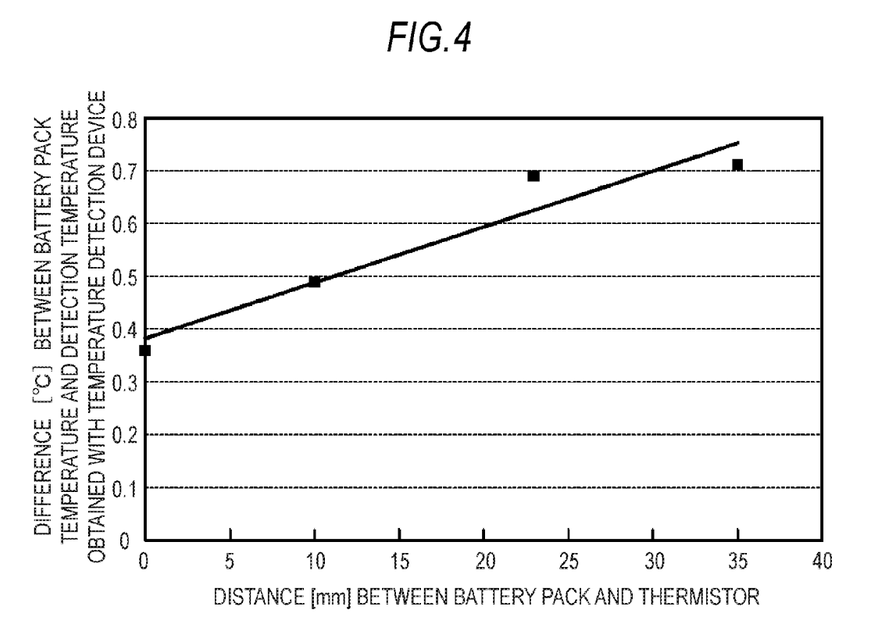
FIG. 4 is a graph showing the measurement results of the samples 1-1 to 1-4.

The measurement results are graphically shown in FIG. 4.

As can be seen from FIG. 4, it is supposed that the following relational expression is typically satisfied in the battery charger 1 of the embodiment of the present invention, in which the temperature detection device is provided on the circuit board 1c.

$$p=\beta q+\theta \quad (1)$$

In the expression, p is a difference [° C.] between the temperature of the battery pack 30 and the detection temperature obtained with the temperature detection device, q is a distance between the battery pack 30 and the temperature detection device, 13 is a heat conduction coefficient, and θ is an initial detection error.

The initial detection error θ is an error which occurs because a thermal conductivity decreases due to presence of a board existing between the battery pack 30 and the temperature detection device and an outer casing of the battery pack 30.

From the above-described results, it can be understood that the detection accuracy decreases as the distance between the position of the battery pack 30 and the temperature detection device on the circuit board 1c increases. For this reason, for realization of high-accuracy temperature detection, it is necessary to dispose the temperature detection device at a position opposite the battery insertion portion 1. Moreover, for realization of high-accuracy temperature detection regardless of the size of a battery charger, it is necessary to dispose the temperature detection device right below the battery insertion portion 1.

When the battery charger 1 according to the embodiment of the present invention was used, specifically, the expression (1) can be expressed by the following expression, from the results shown in Table 1 and FIG. 4.

$$p=0.011q+0.38 \quad (1)'$$

The coefficients β and θ in this linear approximation equation (1)' are calculated by a least-square method (linear approximation). The heat conduction coefficient β and the initial detection error θ are different depending on the battery charger 1 being used.

(ii) Distance Between Temperature Detection Device and Electronic Component

Next, the distance between the temperature detection device and the electronic components need to be considered. Since the respective electronic components generate heat during the charging operation, it may be impossible to detect temperature with high accuracy when the temperature detection device detects heat generated from other components other than the battery pack 30.

Therefore, although the electronic components are supposedly mounted at positions distant from the temperature detection device, since the circuit board 1c is finite in area, the mounting positions of the electronic components require more detailed study.

The greater the heat generated by the electronic component, the more it is necessary to increase the distance between the electronic component and the temperature detection device. Moreover, the larger the detection error, the more it is necessary to increase the distance between the electronic component and the temperature detection device. Therefore, the effect of each electronic component on the temperature detection device 3 can be expressed by the following expression.

$$y=\alpha x \quad (2)$$

In the above expression, y is a shortest distance between the electronic component and the temperature detection device, x is a heat generation temperature of the electronic component (i.e., a difference between the heat generation temperature of the electronic component and the ambient temperature), and α is a coefficient indicative of a temperature detection error.

Figure 5A:
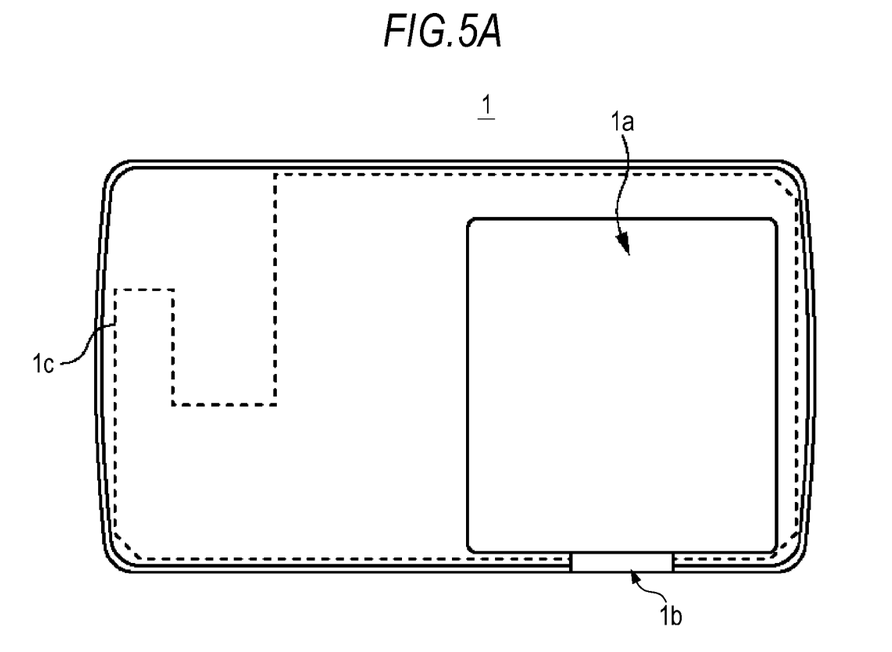
FIGS. 5A and 5B are top views of the battery charger according to the embodiment of the present invention and a circuit board of the battery charger.
Figure 5B:
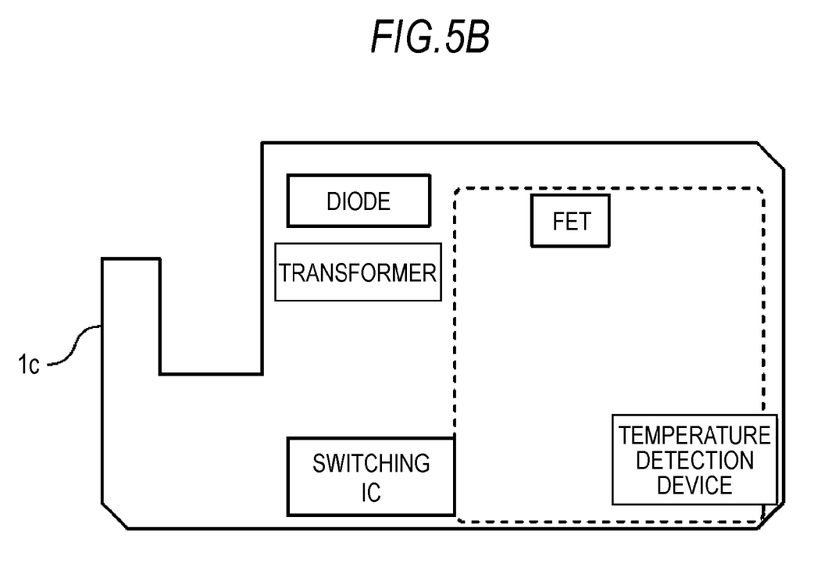

Referring to FIGS. 5A and 5B, the top views of the battery charger 1 and the circuit board 1c are illustrated, respectively. In FIG. 5A, the circuit board 1c accommodated inside the battery charger 1 is depicted with dotted lines. The notch portion formed in the circuit board 1c is provided at a position corresponding to the power supply terminal (not illustrated) for obtaining an AC voltage from a household AC power source, for example.

In FIG. 5B, a dotted portion indicates the position of the battery insertion portion 1a. As illustrated in FIG. 5B, the mounting positions of the temperature detection device 3 and exemplary heat-generating electronic components such as, for example, a switching IC 12, a transformer 13, a diode 14, and an FET 2 are illustrated on the circuit board 1c. The switching IC 12 adjusts a charging current supplied to the battery pack 30 by a PWM (pulse width modulation) method, for example. The FET 2 is turned on during charging of the battery pack 30 and turned off in response to a state of the battery pack 30 thus stopping the charging current.

The further the heat-generating electronic component is mounted from the temperature detection device 3, the greater the reduction in the effect on the detected temperature of the battery pack 30. On the other hand, since the heat generation temperatures of the respective electronic components are different, their possible mounting positions, namely the shortest distances from the temperature detection device 3, are changed depending on the heat generation temperature. In order to examine the positional relationship between the electronic components and the temperature detection device 3, a difference between the surface temperature of the battery pack 30 and the detection temperature obtained with the temperature detection device 3 was measured while changing the charging current that charges the battery pack 30. The measurement results will be described below.

In the measurement, the switching IC, transformer, FET, diode, and temperature detection device were positioned at such positions as illustrated in FIG. 5B.

Sample 2-1

A difference between the heat generation temperature of the switching IC and the ambient temperature inside the battery charger was measured. As the heat generation temperature, the temperature of the switching IC when the charge mode switches from a constant-current charge mode to a constant-voltage charge mode was used. The charging was performed under the conditions where a constant-current charge mode using a constant current of 250 mA is continued until a voltage of the secondary battery in the battery pack 30 has reached 4.2 V per cell.

Sample 2-2

A difference between the heat generation temperature of the transformer and the ambient temperature inside the battery charger was measured under the same conditions as the Sample 2-1.

Sample 2-3

A difference between the heat generation temperature of the diode and the ambient temperature inside the battery charger was measured under the same conditions as the Sample 2-1.

Sample 2-4

A difference between the heat generation temperature of the FET and the ambient temperature inside the battery charger was measured under the same conditions as the Sample 2-1.

The measurement results of the difference between the heat generation temperature of each electronic component and the ambient temperature are shown in Table 2.

TABLE 2

| | Electronic Component | Distance between Electronic Component And Thermistor [mm] | Difference between Heat Generation Temperature of Electronic Component and Ambient Temperature [° C.] | Coefficient α Indicative of Temperature Detection Error |
|---|---|---|---|---|
| Sample 2-1 | Switching IC | 31 | 20.5 | 1.5 |
| Sample 2-2 | Trans-former | 38 | 16 | 2.4 |
| Sample 2-3 | Diode | 51 | 18 | 2.8 |
| Sample 2-4 | FET | 30 | 8 | 3.8 |

Figure 6:
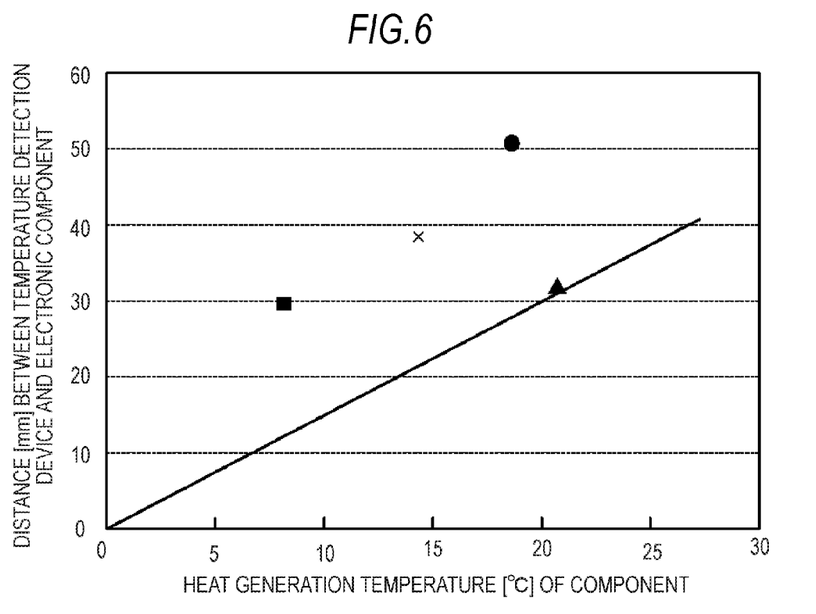
FIG. 6 is a graph showing the measurement results of samples 2-1 to 2-4.

The measurement results obtained with the Samples 2-1 to 2-4 are graphically shown in FIG. 6. In FIG. 6, "triangle" corresponds to the Sample 2-1, and "x", "circle", and "rectangle" respectively correspond to the Samples 2-2, 2-3, and 2-4.

As illustrated in FIG. 6, when the measurement results obtained with the switching IC of the Sample 2-1 were substituted into the above-described expression (2), a result α=1.5 was obtained for the charging current of 250 mA. That is to say, the shortest distance between the temperature detection device and the electronic components is given as y=1.5x for the charging current of 250 mA. Moreover, the range in which the heat generated by the electronic component has an effect on the temperature detection is determined depending on the heat generation temperature of each electronic component.

Subsequently, the distance between each heat-generating electronic component and the temperature detection device was set to such a distance as given in Table 2, and the temperature detection error was measured while changing the charging current.

Sample 3-1

The battery pack was charged in a constant-current charge mode using a charging current of 125 mA, and a difference between the detection temperature on the surface of the battery pack at a point in time when the battery pack temperature has reached 4.2 V and the detection temperature obtained with the temperature detection device was measured. In addition, the coefficient α indicative of the temperature detection error for the charging current of 125 mA was calculated by the same method as used for calculating the coefficient α for the case of the charging current of 250 mA with the Samples 2-1 to 2-4, and the result was α=2.8.

Sample 3-2

A difference between the detection temperature on the surface of the battery pack and the detection temperature obtained with the temperature detection device was measured by the same method as used with the Sample 3-1, except that the charging current was 250 mA. In addition, the coefficient α indicative of the temperature detection error for the charging current of 250 mA was α=1.5 as described above.

Sample 3-3

A difference between the detection temperature on the surface of the battery pack and the detection temperature obtained with the temperature detection device was measured by the same method as used with the Sample 3-1, except that the charging current was 500 mA. In addition, the coefficient α indicative of the temperature detection error for the charging current of 500 mA was α=1.0.

Sample 3-4

A difference between the detection temperature on the surface of the battery pack and the detection temperature obtained with the temperature detection device was measured by the same method as used with the Sample 3-1, except that the charging current was 1000 mA. In addition, the coefficient α indicative of the temperature detection error for the charging current of 1000 mA was α=0.4.

The measurement results of the coefficient α indicative of the temperature detection error and the difference between the detection temperature on the battery pack surface and the detection temperature obtained with the temperature detection device are shown in Table 3.

TABLE 3

| | Charging Current [mA] | α | Difference between Battery Pack Temperature and Thermistor Detection Temperature [° C.] |
|---|---|---|---|
| Sample 3-1 | 125 | 2.8 | 0.31 |
| Sample 3-2 | 250 | 1.5 | 0.67 |
| Sample 3-3 | 500 | 1.0 | 1.07 |
| Sample 3-4 | 1000 | 0.4 | 2.28 |

Figure 7:
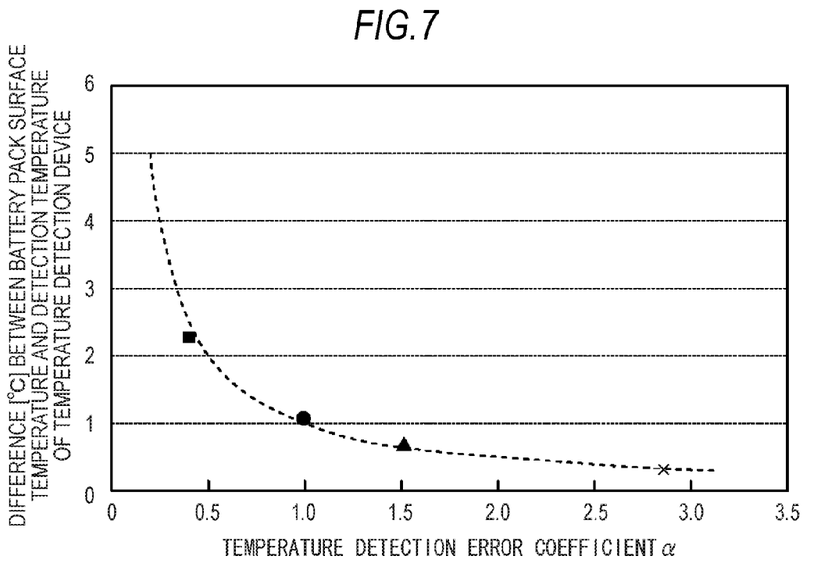
FIG. 7 is a graph showing the measurement results of the samples 3-1 to 3-4.

The measurement results obtained with the Samples 3-1 to 3-4 are graphically shown in FIG. 7. In FIG. 7, "x" corresponds to the Sample 3-1, and "triangle", "circle", and "rectangle" respectively correspond to the Samples 3-2, 3-3, and 3-4.

As can be seen from FIG. 7, it can be understood that in the battery charger of the embodiment of the present invention, the larger the charging current, the smaller is the value of α and the larger is the increase in the temperature detection error. From the graph of FIG. 7, it is supposed that the following relational expression is typically satisfied in the battery charger 1 of the embodiment of the present invention.

$$\Delta T = \gamma / \alpha \epsilon \quad (3)$$

In the expression, $\Delta T$ is a difference, namely a temperature error, between the detection temperature on the battery pack surface and the detection temperature obtained with the temperature detection device. In addition, α is a coefficient indicative of the temperature error, and γ and ε are coefficients unique to a battery charger.

When the battery charger 1 according to the embodiment was used, specifically, the expression (3) can be expressed by the following expression, from the results shown in Table 3 and FIG. 7.

$$\Delta T = 1/\alpha \quad (3)'$$

The coefficients γ and ε in this linear approximation equation (3)' are calculated by a least-square method (linear approximation).

It can be understood from the expression (3) that the larger the coefficient α indicative of the temperature error, the smaller is the temperature detection error. Moreover, it can be understood from Table 3 that the FET 2 with the largest α at the same charging current has the least effect on the temperature detection device 3.

As described above, the mounting positions of the temperature detection device and the respective electronic components in the battery charger 1 are determined from the expressions (1) to (3).

That is to say, the temperature detection device needs to be provided at a position opposite the bottom surface of the battery insertion portion 1a in which the battery pack 30 is inserted. Moreover, the shortest distance between the electronic components and the temperature detection device are determined by their heat generation temperature.

Figure 8:
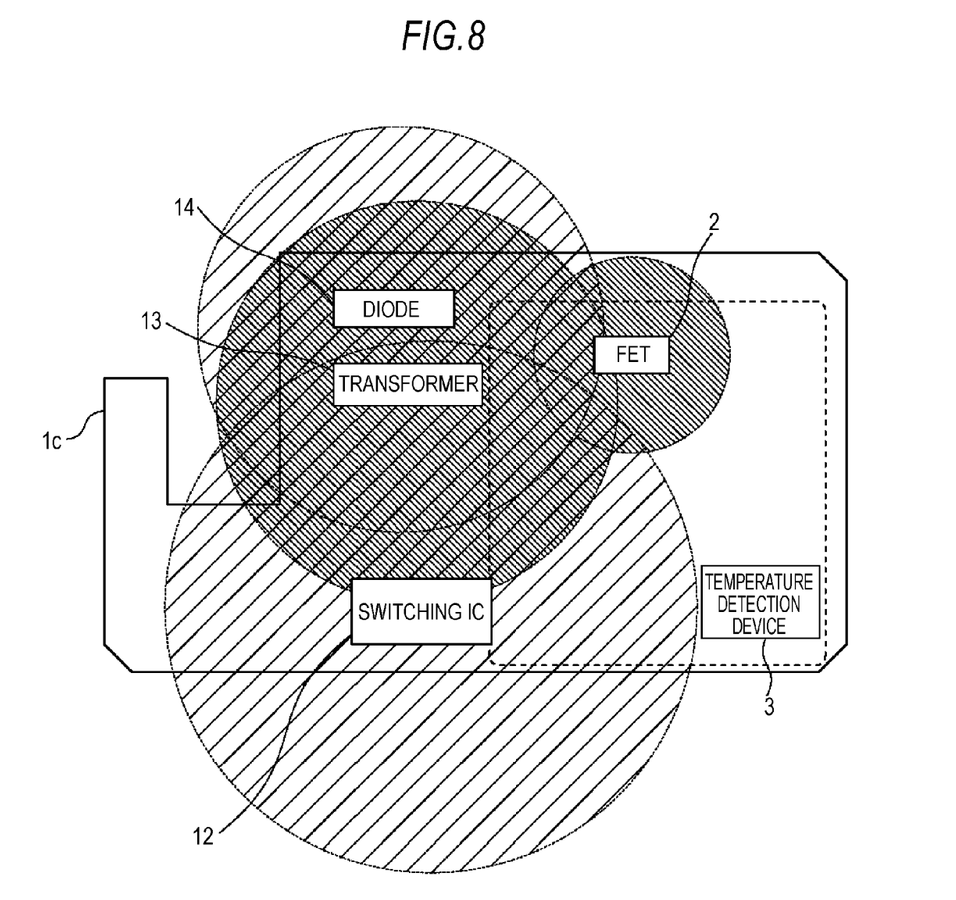
FIG. 8 is a schematic diagram illustrating regions where each electronic component generates heat and affects heat detection according to the embodiment.

The regions in which each electronic component generates heat and affects the temperature detection, as calculated in the above-described manner are illustrated in FIG. 8. In FIG. 8, the distances calculated by the expression (2) for the switching IC 12, the transformer 13, the diode 14, and the FET 2 are depicted as circles having the corresponding distances as radiuses. The temperature detection device 3 is preferably provided at a position where the influence of the electronic components does not reach. Moreover, the positional relationship between the battery pack 30 and the temperature detection device 3 obtained from the expression (1) is also considered. In this way, the position of the temperature detection device 3 is determined so that it is possible to measure the temperature of the battery pack 30 with high detection accuracy.

Furthermore, it is supposed that the internal temperature of the battery charger 1 increases due to the heat generated by the electronic component, and thus thermal convection occurs. Heated air is likely to enter into a wide space. Therefore, it is more preferable to dispose the temperature detection device 3 in a narrower space.

In the embodiment of the present invention, although the battery insertion portion 1a is provided in a region which is close to one end of the battery charger 1, the battery insertion portion 1a may be provided in a central portion or the like of the battery charger 1. In such a case, the heat-generating electronic components will be supposedly mounted on both sides of the battery insertion portion 1a. In such a configuration, it is possible to eliminate the influence of the heat generation in the electronic components by determining the position of the temperature detection device 3 from the positional relationship given by the above-described expressions (1) and (2).

In order to examine the detection accuracy depending on the position of the temperature detection device 3, battery chargers were prepared while changing the position of the temperature detection device, and a difference between the detection temperatures obtained with the temperature detection device and the temperature detection device THb provided on the surface of the battery pack 30 was measured.

Sample 4-1

Similar to the Sample 1-1, when the battery pack 30 was charged, the temperature detection device THb is in contact with the surface of the battery pack 30 so as to measure the temperature of the battery pack 30. A battery charger having a temperature detection device TH5 as illustrated in FIG. 9 mounted on the circuit board 1c was used as Sample 4-1, and the detection temperatures obtained with the temperature detection devices THb and TH5 were measured.

Sample 4-2

Figure 9:
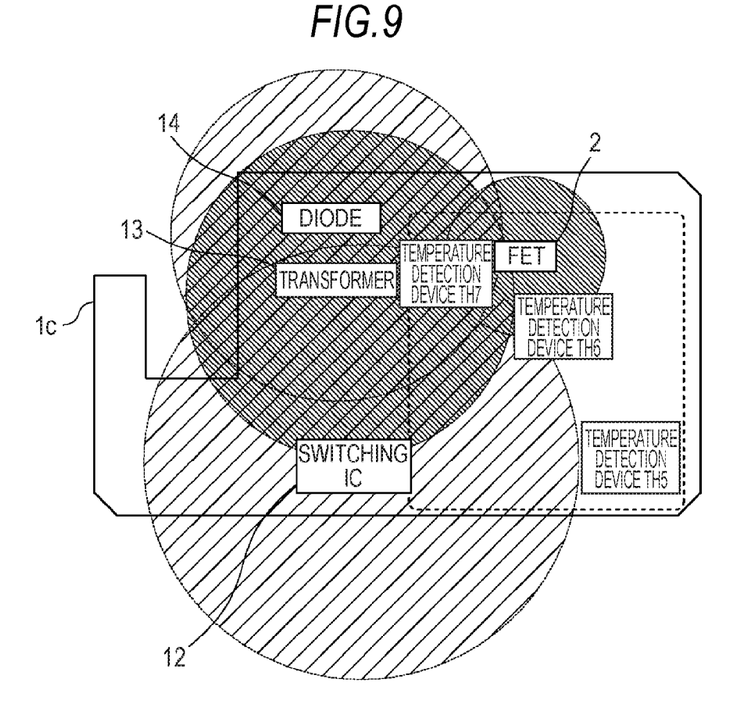
FIG. 9 is a schematic diagram illustrating the mounting positions of temperature detection devices in samples 4-1 to 4-3.

A battery charger was prepared similarly to the Sample 4-1 except that such a temperature detection device TH6 as illustrated in FIG. 9 was provided on the circuit board 1c, and the detection temperatures of the temperature detection devices THb and TH6 were measured.

Sample 4-3

A battery charger was prepared similarly to the Sample 4-1 except that such a temperature detection device TH7 as illustrated in FIG. 9 was provided on the circuit board 1c, and the detection temperatures of the temperature detection devices THb and TH7 were measured.

The measurement results are shown in Table 4.

TABLE 4

| | Temperature Detection Device | Difference between Battery Pack Temperature and Thermistor Detection Temperature [° C.] |
|---|---|---|
| Sample 4-1 | TH5 | 0.8 |
| Sample 4-2 | TH6 | 1.5 |
| Sample 4-3 | TH7 | 3.5 |

Figure 10:
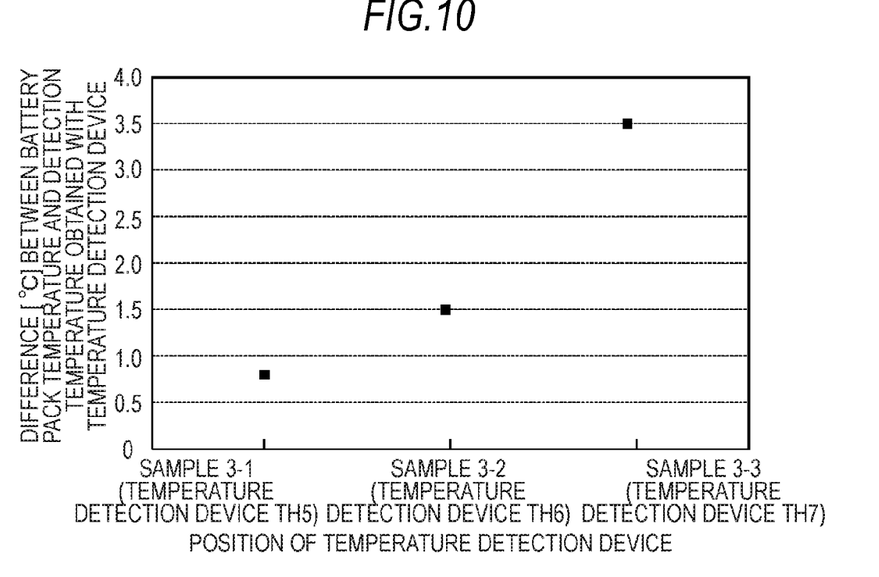
FIG. 10 is a graph showing the measurement results of the temperature detection devices of the samples 4-1 to 4-3.

The measurement results are graphically shown in FIG. 10.

As illustrated in FIG. 10, a detection temperature error of less than 1° C. was obtained with the Sample 4-1 in which the temperature detection device TH5 was provided at a position such that it is hardly affected by the heat generated by the electronic components. On the other hand, the detection temperature error obtained with the Sample 4-2 in which the temperature detection device TH6 was provided at a position such that it is easily affected by the heat generated by the switching IC 12 and the FET 2 was approximately twice that obtained with the Sample 4-1. Moreover, the detection temperature error of 3.5° C. was obtained with the Sample 4-3 in which the temperature detection device TH7 was provided at a position such that it is easily affected by the heat generated by all of the electronic components. Thus, it can be seen that the detection accuracy was greatly decreased.

As described above, in the embodiment, the positions of the temperature detection device 3, the respective electronic components, and the battery insertion portion 1a in which the battery pack 30 is inserted are determined based on the heat generation temperature of the electronic component. Therefore, it is possible to increase the detection accuracy of the temperature of the battery pack 30 by the temperature detection device 3.

Figure 11:
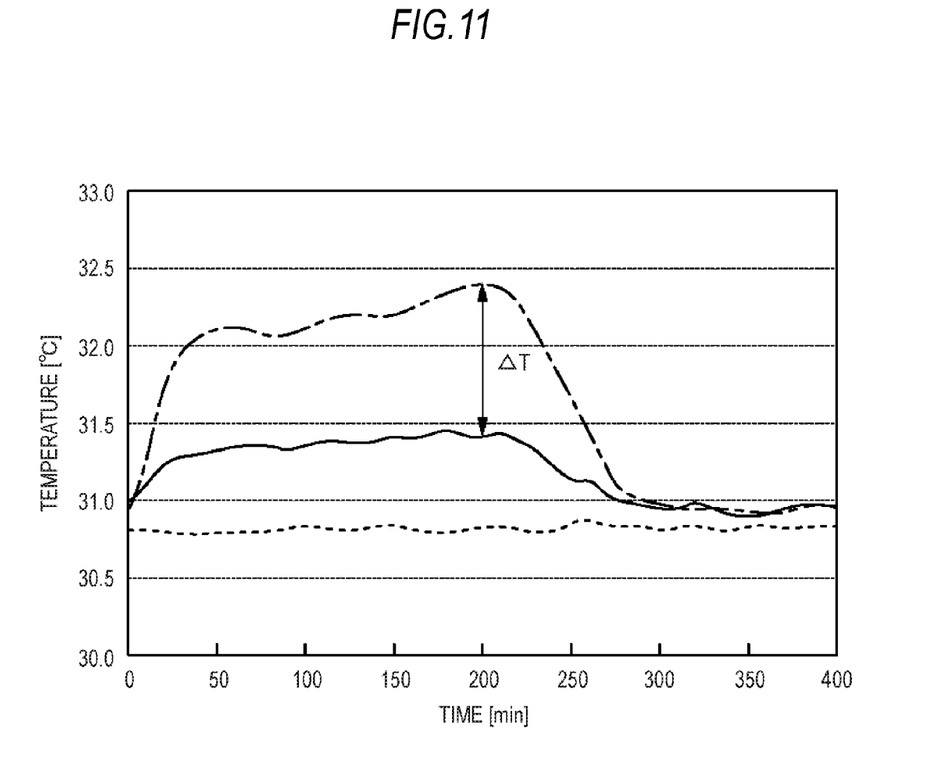
FIG. 11 is a graph showing a temperature of a secondary battery, a temperature detected by a temperature detection device, and the ambient temperature of a battery charger when the battery charger according to the embodiment.

FIG. 11 is a graph showing a change in temperature when the battery pack 30 was charged with the battery charger 1 having the temperature detection device 3 at a position determined by the above-described manner. The broken-line curve is the surface temperature of the battery pack 30. The solid-line curve is the temperature detected by the temperature detection device 3. The dotted-line curve is the ambient temperature inside the battery charger 1. The charging was performed under the conditions where a constant-current charge mode using a constant current of 250 mA continued until a battery voltage has reached 4.2V per cell, and then, the charge mode was switched to a constant-voltage charge mode which continued until a total charging time has reached 400 minutes.

Referring to FIG. 11, the surface temperature of the battery pack 30 starts decreasing at a point in time when a period of 200 minutes has passed from the charging start time. This point in time corresponds to the switching point at which the charge mode is switched from the constant-current charge mode to the constant-voltage charge mode. At the point in time which is 200 minutes from the charging start point, the difference (ΔT in FIG. 11) between the surface temperature of the battery pack 30 and the detection temperature obtained with the temperature detection device 3 provided on the circuit board was around 1° C. Therefore, it can be understood that the temperature detection is performed with high accuracy in the battery charger 1 according to the embodiment of the present invention.

A description of a circuit configuration of a circuit board 1c mounting such electronic components as described above will be provided below.

Circuit Configuration of Battery Charger

Figure 12:
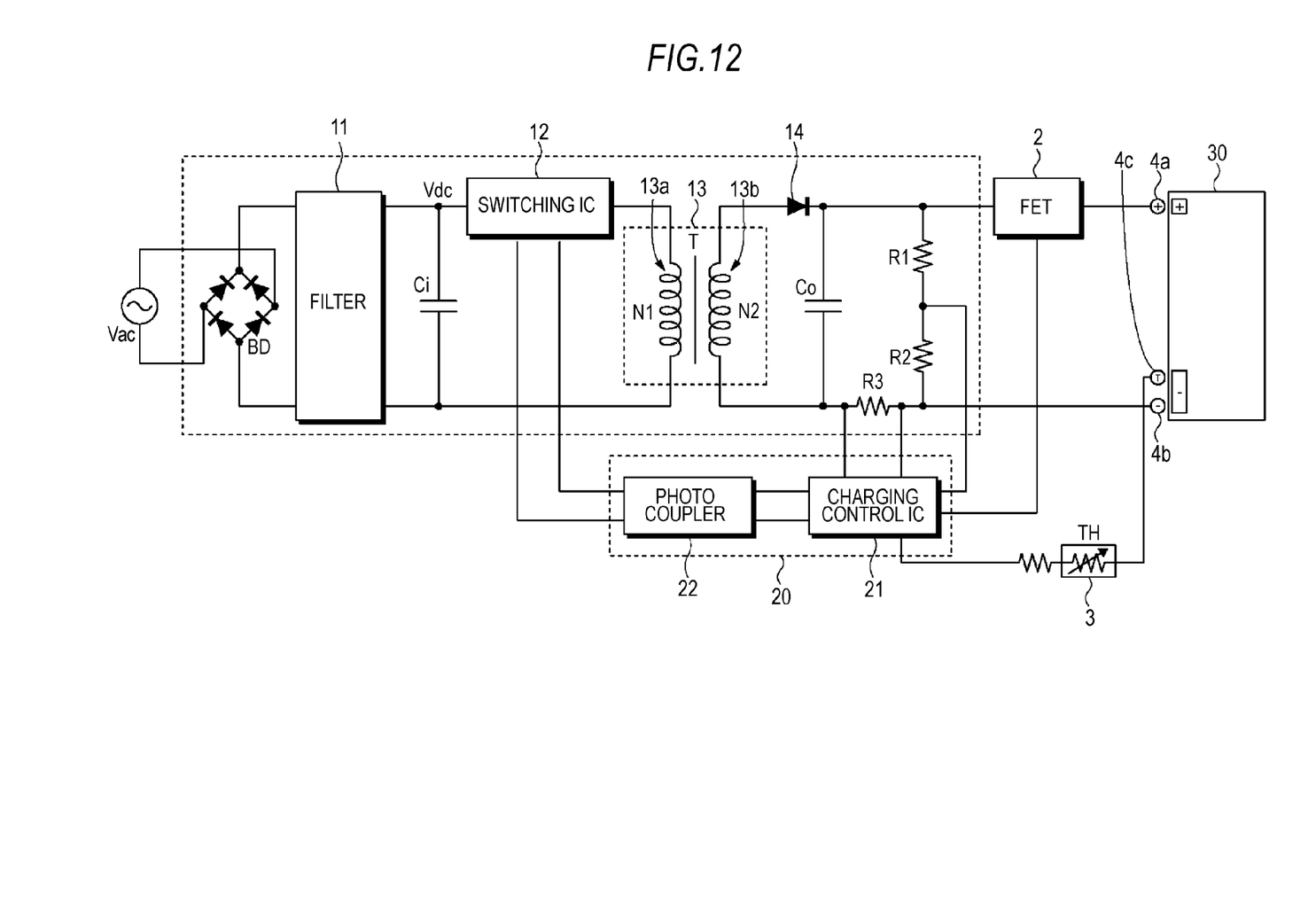
FIG. 12 is a block diagram illustrating a circuit configuration of the battery charger according to the embodiment.

FIG. 12 illustrates an exemplary circuit of the secondary battery charger 1 according to the embodiment. This circuit includes a power circuit portion 10, a FET 2, a temperature detection device 3, and a charging control unit 20. The battery pack 30 is charged in a state where the battery pack 30 is connected to a positive (+) terminal 4a and a negative (−) terminal 4b of the circuit. This circuit is formed by mounting electronic components on a circuit board. The circuit board is disposed inside the battery charger 1. In addition, a communication terminal 4c is provided so that information can be exchanged between the battery charger 1 and the battery pack 30.

The power circuit portion 10 is a switching-controlled voltage converter, for example. The power circuit portion 10 is divided into a high voltage-side primary circuit and a low voltage-side secondary circuit by a transformer 13. The transformer 13 includes a primary coil 13a, which is configured by a primary coil N1 electrically connected to a smoothing capacitor Ci, and a secondary coil 13b, which is configured by a secondary coil N2 electrically connected to the battery pack 30 via the FET 2. The transformer 13 is formed by winding the primary coil N1 and the secondary coil N2 around a core. In the transformer 13, a voltage is induced in the secondary coil 13b when a current is supplied to the primary coil 13a.

The primary circuit includes a bridge circuit BD that is connected to a power supply terminal such as a plug for supplying an AC voltage Vac from an external power source such as a household AC power source, a filter circuit 11, the smoothing capacitor Ci connected to the filter circuit 11, the switching IC 12, and the primary coil N1 of the transformer 13.

The bridge circuit BD rectifies the AC voltage of the AC power source Vac and supplies a full-wave rectified voltage to the filter circuit 11. The filter circuit 11 removes an AC current in a predetermined frequency band which was input from the bridge circuit BD and passes a pulsed AC current in a necessary frequency band. The smoothing capacitor Ci converts the AC current, in which unnecessary frequency components are removed by the filter circuit 11, to a predetermined DC current, for example, thus generating a pulsed DC current having a stable voltage.

The switching IC 12 is a transistor, for example, and performs pulse width modulation. The switching IC 12 is disposed between the primary coil 13a and the charging control unit 20 and is switched on/off based on a pulse signal supplied from the charging control unit 20. When the switching IC 12 is in an ON state, a current is supplied to the primary coil 13a, and thus a current is generated in the secondary coil 13b. When the switching IC 12 is in an OFF state, no current will be supplied to the primary coil 13a, and thus no current will be generated in the secondary coil 13b.

When the switching IC 12 having such a configuration is turned on by the electrical signal from the charging control unit 20, the switching IC 12 converts the AC voltage supplied from the external power source and the like to a DC current via the bridge circuit BD, the filter circuit 11, and the smoothing capacitor Ci. Then, the switching IC 12 supplies the DC current to the primary coil 13a of the transformer 13. When the DC current is supplied to the primary coil 13a, a voltage is induced in the secondary coil 13b, and a DC current is generated in the secondary coil 13b, whereby a charging current is supplied to the battery pack 30.

The switching IC 12 controls the DC current by being switched on/off due to the electrical signal output from the charging control unit 20 based on a voltage and/or current value detected on the secondary circuit side. When the switching IC 12 is turned off by the electrical signal from the charging control unit 20, the switching IC 12 stops supply of the DC current to the primary coil 13a of the transformer 13, thus stopping the charging current supplied to the battery pack 30. The amount of the charging current supplied to the battery pack 30 is determined by the duty ratio of a switching signal that switches on/off the switching IC 12. Therefore, the mean current amount of the DC current can be changed by changing the duty ratio of the ON/OFF switching signal.

The secondary circuit includes a diode 14, a smoothing capacitor Co, voltage detection resistors R1 and R2, and a current detection resistor R3. The diode 14 rectifies the DC current generated in the secondary coil 13b and is configured by a schottky diode, for example. The smoothing capacitor Co rectifies and smoothes the voltage of the charging current supplied from the secondary coil 13b to the battery pack 30, for example.

Moreover, the voltage detection resistors R1 and R2 and the current detection resistor R3 enable the charging voltage and charging current of the battery pack 30 to be detected by a charging control IC 21 of the charging control unit 20.

The FET 2 is configured by a MOSFET (metal oxide semiconductor FET), for example, and cuts the circuit so that the charging current is not supplied. The FET 2 is provided between the secondary coil 13b and one of the positive (+) terminal 4a and the negative (−) terminal 4b that are connected to the battery pack 30. In the circuit illustrated in FIG. 3, since the FET 2 is provided on the high voltage side, a P-channel FET is used as the FET 2, for example. In a general charging/discharging operation, the FET 2 is supplied with a control signal having a logic "L" level (hereinafter appropriately referred to as a low level) from the charging control unit 20 and is normally in an ON state. Since the FET 2 is of the P-channel type, it is turned on with a gate potential that is lower than a source potential by a predetermined level.

Moreover, when a voltage detected during the charging is equal to or larger than a predetermined voltage value, the FET 2 is supplied with a control signal having a logic "H" level (hereinafter appropriately referred to as a high level) from the charging control unit 20, and thus the FET 2 is turned off. Furthermore, when the charging current is detected to be in an overcurrent state, the detected temperature of the battery pack 30 is over a predetermined range, or the charging is determined to be complete, the FET 2 is turned off. In this way, the charging operation stops.

When the FET 2 is provided on the low voltage side, an N-channel FET is used. In this case, the control signal from the charging control unit 20 has a high level, and the FET 2 is in an ON state.

The temperature detection device 3 is configured by a chip thermistor TH that is disposed on the circuit board 1c, for example, and detects the temperature of the battery pack 30. The temperature detection device 3 changes its resistance depending on the temperature and outputs the detected temperature of the battery pack 30 to the charging control IC 21.

The charging control unit 20 includes the charging control IC 21 and a photo coupler 22 having a light-emitting device and a light-receiving device which are not illustrated.

The charging control IC 21 detects the current and voltage supplied from the power circuit portion 10 to the battery pack 30 and the temperature of the battery pack 30. Moreover, the charging control IC 21 outputs the control signal for controlling the charging corresponding to the detected current and voltage to the photo coupler 22 or the FET 2.

The photo coupler 22 includes the light-emitting device such as a light-emitting diode and a light-receiving device such as a photodiode. The light-emitting device is connected to the charging control IC 21 and emits a light signal corresponding to the current or voltage detected by the charging control IC 21. The light-receiving device receives the light signal from the light-emitting device and converts the received light signal to an electrical signal to be supplied to the switching IC 12. In this way, the photo coupler 22 outputs an electrical signal having a luminance level corresponding to the current or voltage detected by the charging control IC 21 to the switching IC 12.

For example, when an abnormal battery or the like is mounted, the charging current increases suddenly, or the charging voltage increases higher than a predetermined value, a control signal that interrupts the circuit is output. In this case, a control signal having a low or high level is output to the FET 2, whereby the turning on/off of the FET 2 is controlled.

Moreover, when the charging current is adjusted, a control signal for achieving desired pulse width modulation is output to the photo coupler 22.

The charging control IC 21 is electrically connected to the light-emitting device of the photo coupler 22 and controls the current supplied to the light-emitting device. Specifically, the charging control IC 21 has a reference voltage source (not illustrated) having a predetermined voltage, and controls the current value supplied to the light-emitting device of the photo coupler 22 based on a difference between the charging voltage and the voltage of the reference voltage source. The light-emitting device of the photo coupler 22 emits light having a luminance level corresponding to the voltage level controlled by the charging control IC 21.

The charging control unit 20 having such a configuration outputs an electrical signal, the voltage level of which is controlled correspondingly to the voltage of the pulsed charging current supplied to the battery pack 30. That is to say, the charging control unit 20 detects the charging current and the charging voltage supplied to the battery pack 30 and the temperature of the battery pack 30 and outputs an electrical signal based on the detected information. The charging control unit 20 outputs a pulse signal, of which the duty ratio is controlled correspondingly to the charge state of the battery pack 30, to the switching IC 12. The charging control IC 21 and the PWM switching IC 12 are connected together via the photo coupler 22 and are thus able to perform real-time feedback control in accordance with the charge state.

In the power circuit portion 10 having such a configuration, when an AC voltage is converted to a DC voltage via the filter circuit 11, the smoothing capacitor Ci, and the like and the DC voltage is supplied to the primary coil 13a of the transformer 13, the secondary coil 13b is induced and the charging current is generated. The charging current has a pulsed DC voltage and is supplied to the battery pack 30. In the power circuit portion 10, the charge state of the battery pack 30 is detected by the charging control IC, and an electrical signal having a voltage level based on the detected information is output from the photo coupler 22. The charging control unit 20 outputs a pulse signal having a pulse width corresponding to the voltage level of the electrical signal to the switching IC 12. Then, in the power circuit portion 10, the turning on/off of the switching IC 12 is controlled in accordance with the duty ratio of the pulse signal, and the current supplied to the primary coil 13a of the transformer 13 is controlled.

The power circuit portion 10 supplies the charging current, of which the state corresponds to the current supplied to the primary coil 13a, from the secondary coil 13b to the battery pack 30. In this way, the power circuit portion 10 supplies the pulsed charging current, which is rectified by the smoothing capacitor Co, to the battery pack 30 in a stable state while monitoring the output state of the charging current.

According to such a circuit configuration, the full charge state is detected from a change in the voltage of the secondary battery accommodated in the battery pack 30. In the embodiment of the present invention, the method of detecting the full charge state of the secondary battery is not particularly limited, and various other methods may be used.

With the battery charger described above, it is possible to detect the temperature of the battery pack with high accuracy on the battery charger side. For this reason, even when the battery pack is not equipped with a temperature detection mechanism, the battery charger is able to perform charge control based on the battery temperature.

Moreover, since the temperature detection device is mounted on the circuit board, the temperature detection device can be mounted stably. For this reason, the temperature can be detected reliably, and it is thus not necessary to incorporate addition components.

Although the present invention has been described with respect to the specific embodiments, the present invention is not limited to the described embodiments, but various modifications are possible based on the technical ideas of the present invention.

For example, the values used in the above embodiments are only for exemplification, and different values may be used if necessary.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A battery charger comprising:
   a circuit board including
   terminal portions that are provided to be exposed to the outside from an insertion portion, in which a secondary battery to be charged is inserted, and electrically connected to the secondary battery;
   a power circuit portion that obtains a voltage from an external power source and supplies a charging current to the secondary battery;
   a temperature detection unit that detects a battery temperature of the secondary battery;
   a charging control switch that turns on/off the charging current; and
   a controller that controls the power circuit portion or the charging control switch based on a voltage and a current of the power circuit portion and the battery temperature of the secondary battery, which are all mounted to a circuit board, wherein
   the temperature detection unit is provided in a part of the circuit board opposed to the insertion portion at a position spaced by a distance apart from each of a plurality of electronic components constituting the power circuit portion and the controller, the distance being equal to or larger than a predetermined distance which is set based on a heat generation temperature of each of the electronic components.

2. The battery charger according to claim 1, wherein a constant charging current is supplied to the secondary battery when a voltage of the secondary battery is equal to or smaller than a predetermined voltage, and a charging current maintaining the predetermined voltage is supplied to the secondary battery when the voltage of the secondary battery has reached the predetermined voltage.

3. The battery charger according to claim 2, wherein the heat generation temperature is a difference between a temperature of the electronic component and the ambient temperature at a point in time when the voltage of the secondary battery has reached the predetermined voltage.

4. The battery charger according to claim 3, wherein the distance between the temperature detection device and each of the electronic components is equal to or larger than a shortest distance y given by an expression (2) below $$y = \alpha x \qquad (2)$$

where, $\alpha$ is a coefficient indicative of a temperature detection error, determined by the charging current supplied to the secondary battery and the environment inside the battery charger, and x is the heat generation temperature of the electronic component.

5. The battery charger according to claim 4, wherein in the expression (2), a difference between a temperature of the secondary battery and a temperature detected by the temperature detection unit is expressed by $1/\alpha$.

* * * * *